United States Patent
Chen et al.

(10) Patent No.: US 11,748,988 B1
(45) Date of Patent: Sep. 5, 2023

(54) SHOT CONTRAS FIVE SELF-SUPERVISED LEARNING OF A PLURALITY OF MACHINE LEARNING MODELS FOR VIDEO ANALYSIS APPLICATIONS

(71) Applicant: Amazon Technologies, Inc., Seattle, WA (US)

(72) Inventors: Shixing Chen, Seattle, WA (US); Xiaohan Nie, Lynnwood, WA (US); David Jiatian Fan, Seattle, WA (US); Dongqing Zhang, Kirkland, WA (US); Vimal Bhat, Redmond, WA (US); Muhammad Raffay Hamid, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 23 days.

(21) Appl. No.: 17/236,688

(22) Filed: Apr. 21, 2021

(51) Int. Cl.
  *G06V 20/40* (2022.01)
  *G06N 20/00* (2019.01)
  (Continued)

(52) U.S. Cl.
  CPC .............. *G06V 20/46* (2022.01); *G06F 16/73* (2019.01); *G06F 16/78* (2019.01); *G06F 18/214* (2023.01);
  (Continued)

(58) Field of Classification Search
  CPC ...... G06V 20/46; G06V 20/49; G06V 10/751; G06N 20/00; G06N 5/04; G06F 16/73;
  (Continued)

(56) References Cited

U.S. PATENT DOCUMENTS

| 10,902,616 B2 | 1/2021 | Brown et al. |
| 11,526,698 B2 | 12/2022 | Lee et al. |

(Continued)

FOREIGN PATENT DOCUMENTS

| CA | 3130573 A1 | 8/2020 |
| WO | 2018/154494 A1 | 8/2018 |

(Continued)

OTHER PUBLICATIONS

Carreira et al., "Quo Vadis, Action Recognition? A New Model and the Kinetics Dataset", In Proceedings of the IEEE Conference on Computer Vision and Pattern Recognition, Feb. 12, 2018, pp. 1-10.

(Continued)

*Primary Examiner* — Mishawn N. Hunter
(74) *Attorney, Agent, or Firm* — NICHOLSON DE VOS WEBSTER & ELLIOTT LLP

(57) ABSTRACT

Techniques for automatic scene change detection in a video are described. As one example, a computer-implemented method includes extracting features of a query shot and its neighboring shots of a first set of shots without labels with a query model, determining a key shot of the neighboring shots which is most similar to the query shot based at least in part on the features of the query shot and its neighboring shots, extracting features of the key shot with a key model, training the query model into a trained query model based at least in part on a comparison of the features of the query shot and the features of the key shot, extracting features of a second set of shots with labels with the trained query model, and training a temporal model into a trained temporal model based at least in part on the features extracted from the second set of shots and the labels of the second set of shots.

20 Claims, 12 Drawing Sheets

(51) Int. Cl.
*G06N 5/04* (2023.01)
*G06F 16/73* (2019.01)
*G06F 16/78* (2019.01)
*G11B 27/34* (2006.01)
*H04N 5/14* (2006.01)
*G11B 27/036* (2006.01)
*G06V 10/75* (2022.01)
*G06F 18/22* (2023.01)
*G06F 18/214* (2023.01)

(52) U.S. Cl.
CPC .............. *G06F 18/22* (2023.01); *G06N 5/04* (2013.01); *G06N 20/00* (2019.01); *G06V 10/751* (2022.01); *G06V 20/49* (2022.01); *G11B 27/036* (2013.01); *G11B 27/34* (2013.01); *H04N 5/147* (2013.01)

(58) Field of Classification Search
CPC .... G06F 16/78; G06K 9/6215; G06K 9/6256; G11B 27/036; G11B 27/34; H04N 5/147
See application file for complete search history.

(56) References Cited

U.S. PATENT DOCUMENTS

| | | | |
|---|---|---|---|
| 11,586,902 | B1 | 2/2023 | Sather et al. |
| 11,640,529 | B2 | 5/2023 | Payne et al. |
| 2017/0103264 | A1 | 4/2017 | Javan et al. |
| 2017/0124400 | A1 | 5/2017 | Yehezkel et al. |
| 2019/0147105 | A1 | 5/2019 | Chu et al. |
| 2019/0294927 | A1 | 9/2019 | Guttmann |
| 2019/0311202 | A1 | 10/2019 | Lee et al. |
| 2019/0354765 | A1 | 11/2019 | Chan et al. |
| 2020/0193163 | A1 | 6/2020 | Chang et al. |
| 2020/0293783 | A1 | 9/2020 | Ramaswamy et al. |
| 2020/0394458 | A1 | 12/2020 | Yu et al. |
| 2021/0004589 | A1 | 1/2021 | Turkelson et al. |
| 2021/0049468 | A1 | 2/2021 | Karras et al. |
| 2021/0064965 | A1 | 3/2021 | Pardeshi et al. |
| 2021/0073944 | A1 | 3/2021 | Liu et al. |
| 2021/0089779 | A1 | 3/2021 | Chan et al. |
| 2021/0117728 | A1 | 4/2021 | Lee et al. |
| 2021/0132688 | A1 | 5/2021 | Kim et al. |
| 2021/0142066 | A1 | 5/2021 | Jayaram et al. |
| 2021/0142160 | A1 | 5/2021 | Mohseni et al. |
| 2022/0021716 | A1 | 1/2022 | Nagendran et al. |
| 2022/0101112 | A1 | 3/2022 | Brown et al. |

FOREIGN PATENT DOCUMENTS

| | | |
|---|---|---|
| WO | 2018/217635 A1 | 11/2018 |
| WO | 2020/012069 A1 | 1/2020 |
| WO | 2020/068140 A1 | 4/2020 |
| WO | 2020/068784 A1 | 4/2020 |
| WO | 2021/041078 A1 | 3/2021 |
| WO | 2021/096776 A1 | 5/2021 |
| WO | 2021/105157 A1 | 6/2021 |

OTHER PUBLICATIONS

Deng et al., "ImageNet: A Large-Scale Hierarchical Image Database", In Proceedings of the IEEE Conference on Computer Vision and Pattern Recognition, Jun. 2009, 9 pages.

Hara et al., "Can Spatiotemporal 3D CNNs Retrace the History of 2D CNNs and ImageNet?", In Proceedings of the IEEE Conference on Computer Vision and Pattern Recognition, Apr. 2, 2018, 10 pages.

He et al., "Momentum Contrast for Unsupervised Visual Representation Learning", Facebook AI Research (FAIR), Mar. 23, 2020, 12 pages.

He et al., "Deep Residual Learning for Image Recognition", In Proceedings of the IEEE Conference on Computer Vision and Pattern Recognition, Dec. 10, 2015, pp. 1-12.

Hershey et al., "CNN Architectures for Large-Scale Audio Classification", In Proceedings of the IEEE International Conference on Acoustics, Speech and Signal Processing, Jan. 10, 2017, 5 pages.

Rao et al., "A Local-to-Global Approach to Multi-modal Movie Scene Segmentation", CVPR 2020, Computer Vision Foundation, 2020, pp. 10146-10155.

Notice of Allowance, U.S. Appl. No. 17/107,514, dated Jun. 7, 2023, 25 pages.

SHOT CONTRAS FIVE SELF-SUPERVISED LEARNING OF A PLURALITY OF MACHINE LEARNING MODELS FOR VIDEO ANALYSIS APPLICATIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
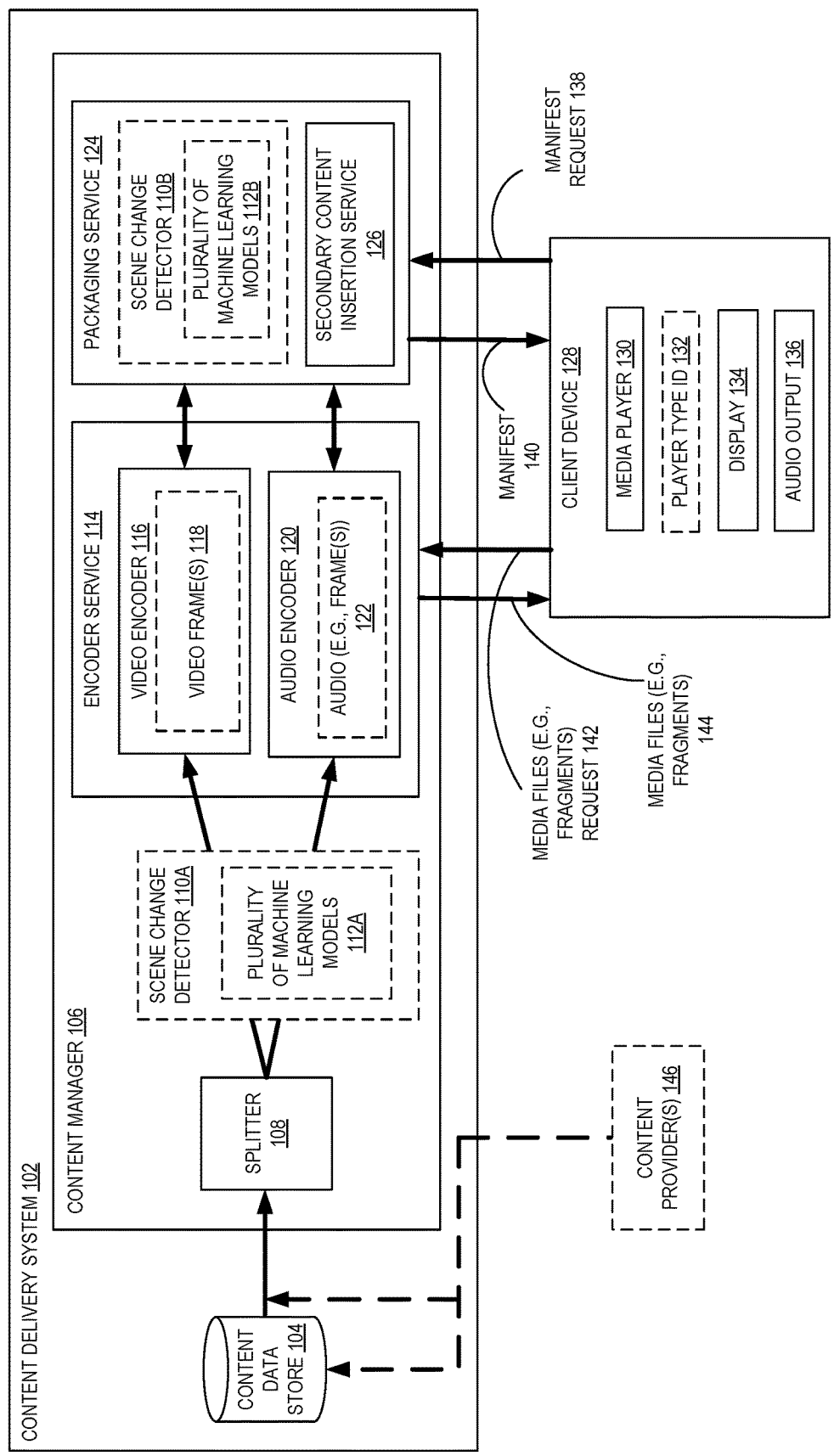
FIG. 1 is a diagram illustrating an environment including a content delivery system having a scene change detector and a packaging service that includes a secondary content insertion service according to some embodiments.

Various embodiments of methods, apparatuses, systems, and non-transitory computer-readable storage media for (e.g., multi-modal) scene change detection are described. According to some embodiments, a scene change detection service detects one or more scene changes (e.g., scene boundaries) in multimedia titles (e.g., video with corresponding audio). In certain embodiments, a plurality (e.g., an ensemble) of machine learning models is trained and used to generate an inference of one or more scene changes in a title. The inference may be used to (e.g., automatically) generate one or more cue-points based on an inferred scene change (e.g., scene boundary), for example, for insertion of secondary content at a cue-point.

In filmmaking and video production, shots and scenes play a crucial role in effectively communicating a storyline by dividing it into easily interpretable parts. In certain embodiments, the term "shot" may generally refer to a contiguous sequence (e.g., series) of frames recorded (e.g., by a single camera) over an uninterrupted period of time, and the term "scene" may generally refer to a set (e.g., series) of shots filmed in a particular context (e.g., the action in a single location and continuous time) (e.g., a series of shots depicting a semantically cohesive part of a story).

As a fundamental unit, a scene plays a critical role to semantically understand the content in titles (e.g., videos with corresponding audio) in certain embodiments, e.g., scenes breaking the storyline of titles (e.g., movies and television (TV) episodes) into semantically cohesive parts. In certain embodiments, localizing shots and scenes is an important step towards building a semantic understanding of videos (e.g., movies and TV episodes), and offers a broad range of applications including preview generation for browsing and discovery, content-driven video search, and minimally disruptive video-advertisement insertion.

In certain embodiments, a shot is a critical unit in tasks aiming at understanding and analyzing videos. However, acquiring shot-level labels for supervised learning of such tasks can be difficult and costly. Embodiments herein use unlabeled data to solve this issue. Embodiments herein are directed to contrastive learning that learns the shot-based features that are general-purpose. In certain embodiments, a model (e.g., its network) takes spatial relationships from input space and considers temporal information in terms of shots, which makes it efficient and effective. The learned features can be conveniently adopted to improve the performance of various use cases, especially when labeled data is limited. Applications include, but are not limited to, scene boundary detection, shot type classification, action recognition, and place prediction.

Certain embodiments herein are directed to scene change detection (SCD), and more particularly, to automatically detecting (e.g., the timestamps in titles) where a scene change happens. For numerous content delivery service use cases, scene change detection is a key problem that can have huge impact on various practical applications. For example, for certain (e.g., advertising-supported) videos, it may be desirable to insert advertisement(s) at one or more cue points detected as scene changes to provide minimal disruption for viewers (e.g., customers). By cutting full-length titles into clips constrained by scene boundaries, promotional video assets with engaging information can be generated for customers. For example, it may be desirable to display certain additional information about the title while viewing the title. This additional information may include one or more of cast (e.g., actor biographies) and characters, trivia, bonus videos and photos, music being played in the title, etc. In certain embodiments, this additional information is displayed on a scene granularity, e.g., such that scene change detection can be directly applied to determine scene boundaries where synopsis can be further generated for each identified scene. However, due to the lack of a clear definition and sufficient training dataset, scene change detection is still an unsolved problem subject to ongoing research. Further, video analysis tasks may rely heavily on computation resources to get reasonable results, and thus performing efficient procedures are critical and necessary in certain embodiments. To this end, embodiments herein train (e.g., and utilize) a (e.g., multi-modality) plurality of (e.g., visual and aural) machine learning models (e.g., models based on deep neural networks) to provide an efficient and accurate way for (e.g., automatic) scene change detection. However, given the complex temporal structure of scenes, finding scene boundaries can be a challenging task requiring large amounts of labeled training data. As a solution to this challenge, embodiments herein utilize a self-supervised contrastive learning approach to learn a shot-representation that maximizes the similarity between nearby shots compared to randomly selected shots.

FIG. 1 is a diagram illustrating an environment 100 including a content delivery system 102 having a scene change detector (110A and/or 110B) and a packaging service 124 that includes a secondary content insertion service 126 according to some embodiments. The depicted content delivery system 102 includes a content data store 104, which may be implemented in one or more data centers. As one example, a media file (e.g., a video with corresponding audio) that is to be encoded is accessed from the content data store 104 by content manager 106. In one embodiment, the video encoder 116 of the encoder service 114 is to encode the video into a plurality of video representations (e.g., video frames 118) and/or the audio encoder 120 of the encoder service 114 is to encode the audio (e.g., corresponding to the video of a single title) into a plurality of audio representations (e.g., audio 122 (e.g., audio frames)). For example, with splitter 108 splitting the input file into a video portion and audio portion for servicing by video encoder 116 and audio encoder 120, respectively.

The encoded video 118 (e.g., and audio 122) may then be utilized by packaging service to package the content for delivery to a client device 128, e.g., for playback. Certain embodiments herein generate a manifest of the available video representations (e.g., stored in content delivery system 102) and form a superset manifest. In these embodiments, the packaging service 124 then uses the superset manifest to generate a manifest identifying a proper subset of video and audio representations for a particular client device 128 (e.g., based on the client's media player 130 (e.g., determined from its type ID value 132), display 134 resolution, audio output 136 capabilities, and/or available bandwidth). In certain embodiments, the content is stored in the content delivery system 102 in two parts: (i) the manifest of all available media representations (e.g., their URL addresses and, optionally, other characteristics, and (ii) the media representations (e.g., stream of fragments) in a single (e.g., container) or multiple files. In one embodiment, a client device is to read (or store) a manifest 140 (e.g., sent in response to manifest request 138) before the client device may make a request 142 for the media from that manifest, and thus access media files 144 (e.g., encoded video and corresponding encoded audio).

Optionally, content provider(s) 146 may be included to provide a video (e.g., and audio) file, for example, directly to the content manager 106 without utilizing the content data store 104 or into storage in content data store 104.

In certain embodiments, secondary content insertion service 126 adds secondary content (e.g., advertisement(s), additional information about the multimedia title, etc.) into a main content. In one embodiment, encoder service 114 is to encode both the main content and secondary content, e.g., and the secondary content insertion service 126 is to insert the secondary content into the main content. Content manager 106 (e.g., secondary content insertion service 126) may utilize scene changes to insert content based at least in part on those scene change(s), e.g., scene boundaries.

Embodiments herein include a scene change detector (e.g., scene change detection service), for example, scene change detector 110A for detecting a scene change on a (e.g., video) file before encoding and/or scene change detector 110B for detecting a scene change on the (e.g., video) file after encoding. Certain embodiments utilize a plurality of machine learning models to infer one or more scene changes in a (e.g., video) file, e.g., plurality of machine learning models 112A for scene change detector 110A and/or plurality of machine learning models 112B for scene change detector 110B. Plurality of machine learning models may utilize one or more (e.g., a plurality of) machine learning models trained for video (e.g., scene change) detection tasks and/or one or more (e.g., a plurality of) machine learning models trained for audio (e.g., scene change) detection tasks (e.g., as discussed below in reference to FIGS. 2-6).

Figure 2:
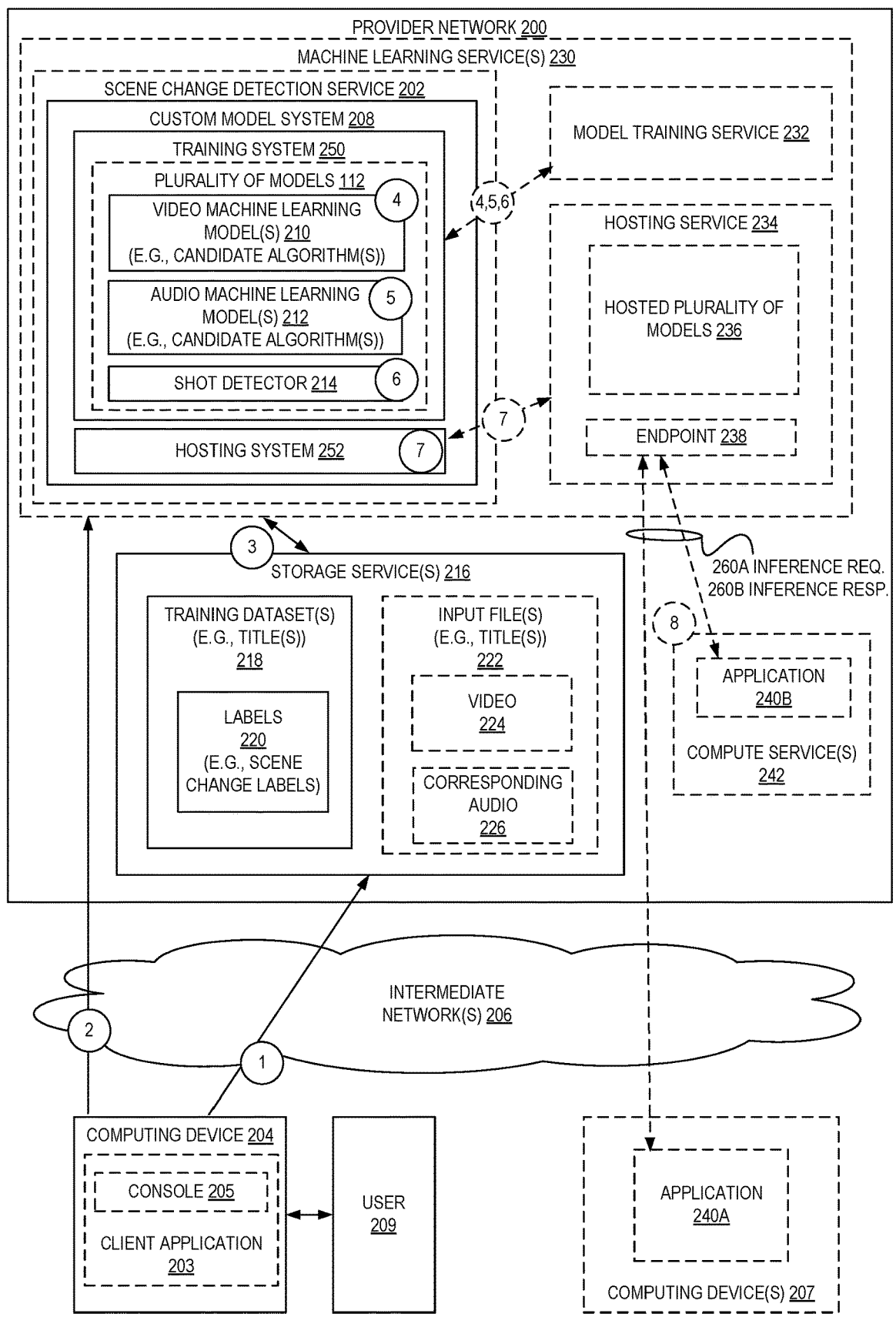
FIG. 2 is a diagram illustrating an environment for creating, training, and using a plurality of machine learning models according to some embodiments.

FIG. 2 is a diagram illustrating an environment for creating, training, and using a plurality of machine learning models according to some embodiments. FIG. 2 includes a scene change detection service 202, one or more storage services 216, one or more machine learning services 230, and one or more compute services 242 implemented within a multi-tenant provider network 200. Each of the scene change detection service 202, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDN$_S$), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The scene change detection service 202, in some embodiments, is a machine learning powered service that makes it easy for users to detect one or more scene changes in an input video file, e.g., to infer the probability that a particular boundary (e.g., shot boundary) is a scene boundary.

The training system 250, for example, may enable users to generate a plurality of models 112 of one or more video machine learning models 210 and/or one or more audio machine learning models 212 that output feature vectors for an input (for example, of a video 224 (e.g., and its corresponding audio 226), e.g., from input file(s) 222. The training system 250, for example, may enable users to generate a classifier type of model 212 that outputs a value or other indication for a classification task from an input of a file 222 (for example, classification vectors, e.g., the value being a confidence value that an identified file includes a feature (e.g., object) (e.g., of a class as discussed herein) that is being searched for in the file).

Embodiments herein allow a customer to create a plurality of models 112 (e.g., an ensemble of models) of one or more video machine learning models 210 and/or one or more audio machine learning models 212 by supplying a training dataset 218 (e.g., including labels 220 that indicate one or more scene changes). In certain embodiments, trained plurality of models 112 allow customers/users to infer one or more scene changes, e.g., as indicated by a probability that a certain time (e.g., of a shot boundary) is a scene change.

In some embodiments, the scene change detection service 202—via use of a custom model system 208—allows users to build and use trained plurality of models 112 of video model(s) 210 and audio model(s) 212.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm(s) into a video machine learning model 210 and/or an audio machine learning model 212 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 202 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a video machine learning model 210 (e.g., and an audio machine learning model 212), this file (or files) may include labels corresponding to the file (e.g., video and audio), e.g., with a label indicating that a scene change is to be detected.

Thereafter, at circle (2) the computing device 204 may issue one or more requests (e.g., API calls) to the machine learning service 230 that indicate the user's 209 desire to train one or more algorithms into one or more video machine learning models 210 and/or one or more audio machine learning models 212. The request may be of a type that identifies which type of model(s) are to be created or identifies that the machine learning service 230 itself is to identify the candidate video model(s) 210 and/or candidate audio models 212. The request may also include one or more of an identifier of a storage location or locations storing the data 218 (e.g., an identifier of the labels 220), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220, etc. In some embodiments, the request includes an identifier (e.g., from the user 209) of the candidate algorithm(s) 210/112 themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220), etc. Thus, the custom model system 208 may retrieve any stored data 218 elements as shown at circle (3), which may be from a storage location within the provider network 200 or external to the provider network 200.

In some embodiments, the training (at circle (4)) of the video machine learning model(s) 210 includes performing (at optional, dotted circle (4)) by training service 232 of machine learning service 230 a particular training job (e.g., hyperparameter optimization tuning job), or the like. In some embodiments, the training (at circle (5)) (e.g., on the same title(s) as the video machine learning model(s) were trained) of the audio machine learning model(s) 210 includes performing (at optional, dotted circle (5)) by training service 232 of machine learning service 230 a particular training job (e.g., hyperparameter optimization tuning job), or the like. In some embodiments, a shot detector 214 is used to partition each (e.g., video) file into a plurality of shots. In one embodiment, the shot detector 214 is a machine learning model trained to infer shot boundaries in the (e.g., video) file. In one embodiment, shot detector 214 is to detect that the content of one frame is different enough from the next frame, such that it can be inferred that a shot transition exists between them.

In some embodiments, the hosting system 252 (at circle (7)) of the custom model system 208 may make use (at optional, dotted circle (7)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, predicted scene change (e.g., scene boundary)) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user (e.g., in a graphical user interface of the application) and/or exported as a data structure (e.g., in a selected format).

In certain embodiments, shots can be accurately localized using low level visual cues, but scenes (e.g., in movies and TV episodes) tend to have complex temporal structure of their constituent shots and therefore pose a significantly more difficult challenge for their accurate localization. In certain embodiments, unsupervised approaches for scene boundary detection do not offer competitive levels of accuracy, but supervised approaches require large amounts of labeled training data and therefore do not scale well. In certain embodiments, self-supervised learning approaches may be applied to learn generalized visual representations for images and short videoclips, but it is unclear how to extend these approaches to long-form videos, e.g., because the relatively simple data-augmentation schemes used by the self-supervised methods cannot encode the complex temporal scene-structure often found in long-form videos (e.g., movies and TV-episodes). To address this challenge, embodiments herein are directed to a contrastive learning approach that naturally makes use of the underlying production process of long-form videos where directors and editors carefully arrange different shots and scenes to communicate the story in a smooth and believable manner. This underlying process gives rise to an effective invariance, e.g., nearby shots tend to have the same set of actors enacting a semantically cohesive story-arch, and are therefore in expectation more similar to each other than a set of randomly selected shots. This invariance allows embodiments herein to consider nearby shots as augmented versions of each other where the augmentation function can implicitly capture the local scene-structure significantly better than other augmentation schemes. Given a shot, certain embodiments herein try to: (a) maximize its similarity with its most similar neighboring shot, and (b) minimize its similarity with a set of randomly selected shots (see FIG. 3 for an illustration).

Scene boundary detection relates to the problem of identifying the locations in videos where different scenes begin and end. Certain embodiments herein do not (e.g., but certain embodiments do) adopt an unsupervised-learning approach that clusters the neighboring shots into scenes using spatiotemporal video features, e.g., by clustering shots based on their color similarity to identify potential boundaries, followed by a shot merging algorithm to avoid over-segmentation. Certain embodiments herein do not (e.g., but certain embodiments do) learn scene boundary detection using human-annotated labels, e.g., where such an approach requires a large amount of labeled training data and is therefore difficult to scale.

Figure 3:
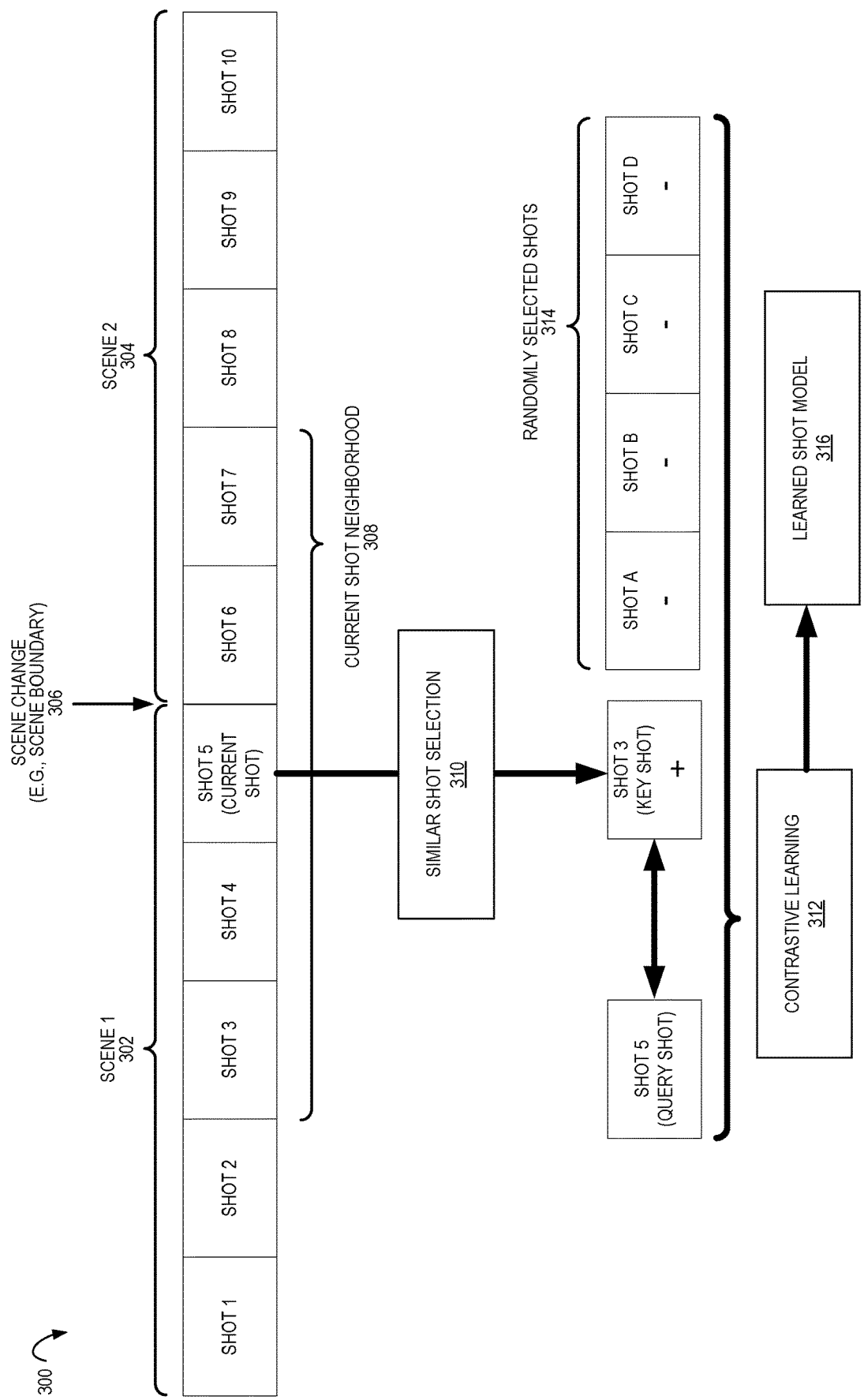
FIG. 3 is a diagram illustrating contrastive learning according to some embodiments.

FIG. 3 is a diagram 300 illustrating contrastive learning 312 according to some embodiments. FIG. 3 depicts a plurality of shots of a video having a scene change 306 between shot five of first scene 302 and shot six of second scene 304 of a same title according to some embodiments. Although the plurality of shots are shown as ten shots, it should be understood that any number of shots may be present in a title (e.g., video). Current shot neighborhood 308 can be slid a certain number of shots to the left and right (e.g., previously and after, respectively) for a corresponding current shot (e.g., shown as shot 5 in FIG. 4). In certain embodiments, the story-arch of each scene is distinguishable and semantically coherent. For example, where similar shot selection 310 determines that shot three from current shot neighborhood 308 is most similar to current (e.g., query) shot five (e.g., shots three and five are augmented versions of each other). This augmentation approach is able to capitalize on the underlying film-production process and can encode the scene structure better than other augmentation methods. After performing the similar shot selection 310, certain embodiments herein utilize contrastive learning 312 to (a) maximize the similarity between the query shot (e.g., shot five) and the key shot (e.g., shot three), and (b) minimize the similarity of the query with randomly selected shots 314 (e.g., shots A-D from the same title), e.g., to generate a learned shot model 316 (e.g., that outputs a learned shot representation).

In certain embodiments, a self-supervised learning (SSL) algorithm attempts to learn data-representations using unlabeled data by solving a surrogate (or pretext) task using supervised learning. The supervision signal for training can be automatically created without requiring labeled data. In certain embodiments, a contrastive learning algorithm attempts to learn data representations by contrasting similar data against dissimilar data while using contrastive loss functions. Embodiments herein use contrastive learning to learn shot-representations, e.g., by incorporating a data-augmentation mechanism that can exploit the underlying filmmaking process and therefore can encode the local scene-structure more effectively.

Figure 4A:
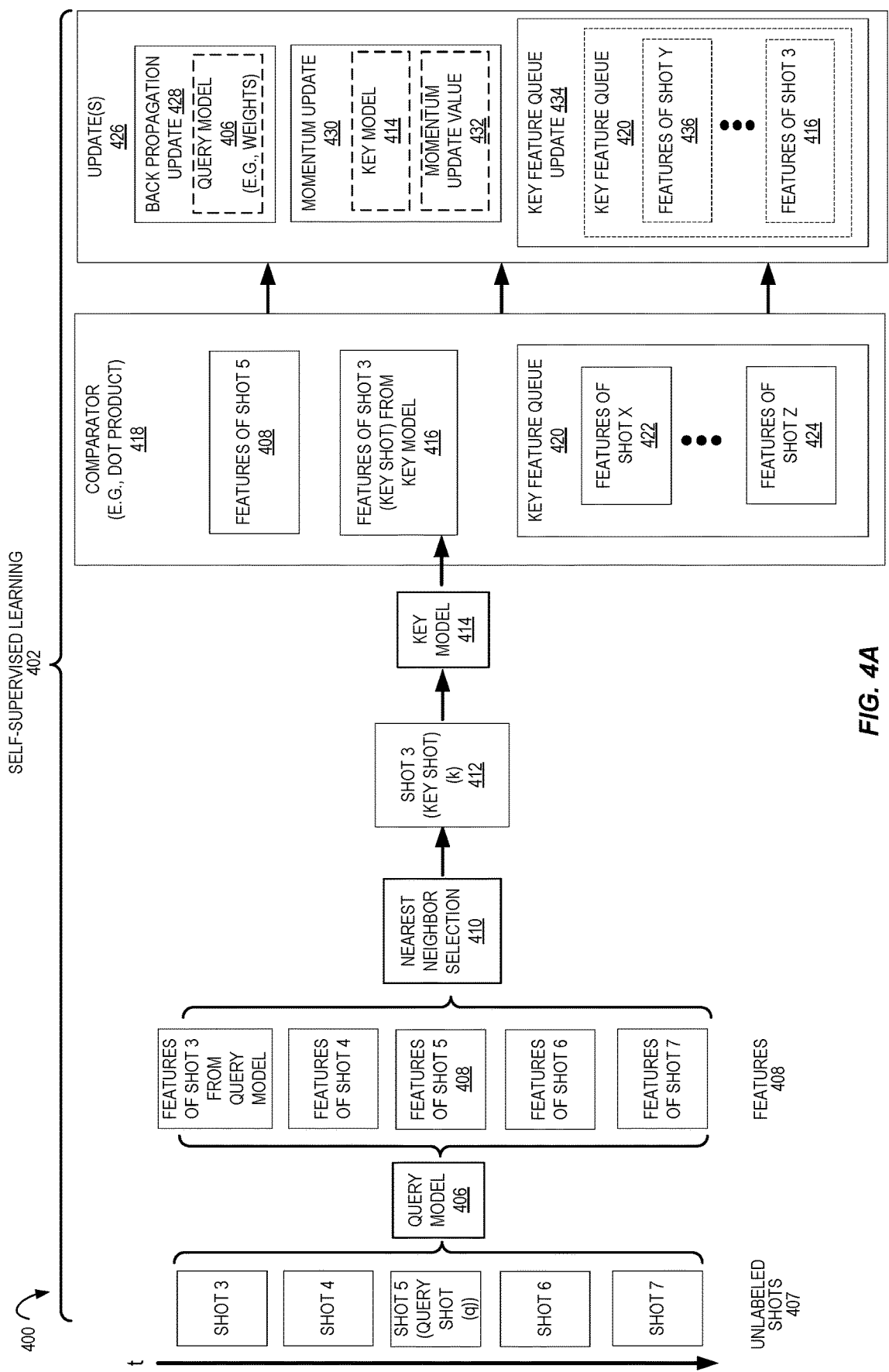
FIG. 4A is a diagram illustrating self-supervised learning according to some embodiments.
Figure 4B:
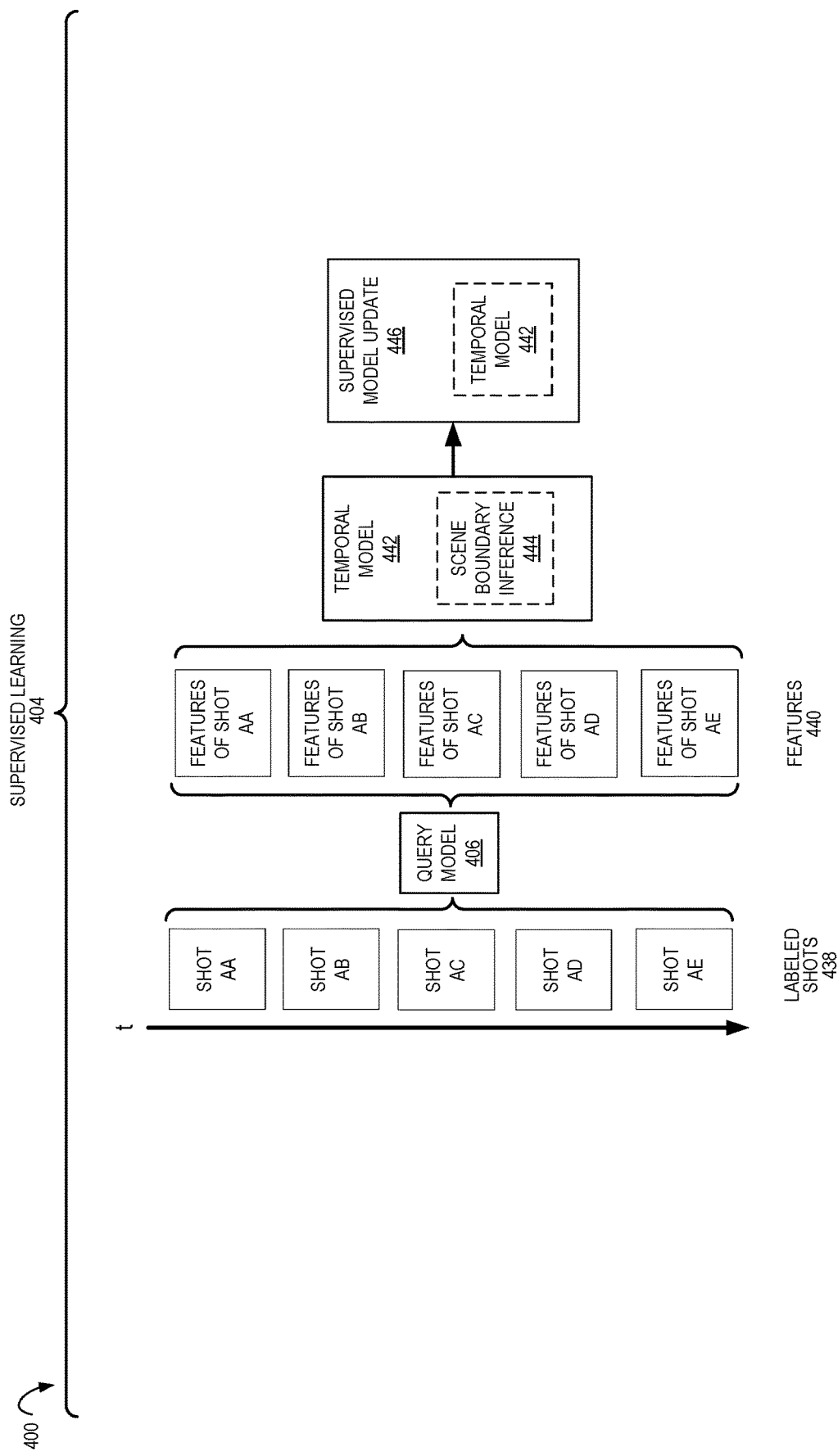
FIG. 4B is a diagram illustrating supervised learning according to some embodiments.

FIG. 4A is a diagram 400 illustrating self-supervised learning 402 according to some embodiments. FIG. 4B is a diagram 400 illustrating supervised learning 404 according to some embodiments.

In FIG. 4A, a plurality of in-video-order shots (e.g., with video time (t) increasing from shot three to shot four, shot four to shot five, etc.) are provided as input (e.g., from shot detector 214 in FIG. 2). At a high level, certain embodiments of self-supervised learning 402 use query model 406 on unlabeled data (e.g., unlabeled shots 407 having no utilized indication of a scene boundary) to extract the (e.g., visual and/or audio) features 408 of a given query shot ("q") (e.g., shot five) and its neighboring shots (e.g., a number of shots surrounding the query shot, shown as two shots forward and two shots backward in FIG. 4A, i.e., shown as previous shots 3 and 4 and following shots 6 and 7), nearest neighbor selection 410 finds the key shot ("k") 412 which is most similar to the query shot within its neighborhood, passes the key shot through a key model 414 (e.g., key encoder) to extract the (e.g., visual and/or audio) features 416 of the key shot 412, comparator 418 contrasts the query shot's features 408 with the key shots features 416 (for example, and contrasts the query shot's features 408 with the set of already queued features from key feature queue 420, e.g., features of other shots, such as, but not limited to, features of shot X 422 through features of shot Z 424), e.g., and then uses that comparison(s) to determine any updates 426 to one or more of the models (e.g., query model 406 and/or key model 414). In certain embodiments, updates 426 include updating (e.g., via a contrastive loss function) query model 406 (e.g., its weights) through back-propagation update 428 and/or updating key model 414 through momentum update 430 (for example, based at least in part on a provided momentum update value 432, e.g., as discussed below).

In certain embodiments, the features from previous iterations of key shot are stored in key feature queue 420, e.g., to be used as (e.g., "negative") randomly selected shots. In certain embodiments, updates 426 include a key feature queue update 434 that inserts features 416 from key shot into key feature queue 420, e.g., and causes the deletion of the oldest (e.g., in order of insertion into queue 420) entry from the queue 420, shown as deleting entry with features of shot X 422, and sliding the other entries forward such that the next entry to be deleted will be entry with features of shot Y 436. In one embodiment, comparator 418 performs a dot product operation on each of the features (e.g., on an element by element and/or feature vector by feature vector basis). Thus, the above may be utilized to train query model 406 and/or key model 414.

In FIG. 4B, a plurality of in-video-order shots (e.g., with elapsed video time (t) increasing from shot AA to shot AB, shot AB to shot AC, etc.) are provided as input (e.g., from shot detector 214 in FIG. 2). At a high level, certain embodiments of supervised learning 404 use query model 406 trained by self-supervised learning 402 on labeled data (e.g., labeled shots 438 having an indication of a scene boundary) to extract the (e.g., visual and/or audio) features 440 of each shot. At a high level, certain embodiments of supervised learning 404 pass the features 440 through a temporal model 442 (e.g., temporal encoder) to generate an inference, e.g., a scene boundary inference 444 that indicates a probability that a boundary between shots is a scene boundary. In certain embodiments, temporal model 442 determines temporal information among the shots. In certain embodiments, the (e.g., scene boundary) labels and the output of temporal model 442 are used in a supervised model update 446, e.g., to update the temporal model. Such a trained temporal model 442 (e.g., along with query model 406) may then be used to perform an inference on input videos, e.g., once deployed. A separate model may be utilized for each of a video machine learning model 210 and an audio machine learning model 212, e.g., but trained according to the disclosure herein. In one embodiment, the temporal model 442 is a language machine learning model, e.g., language machine learning algorithm trained for computer vision task(s).

Referring to FIGS. 2, 4A, and 4B, in certain (e.g., shot level representation learning) embodiments, given a full-length input video 222, shot detector 214 divides the video (e.g., and its corresponding audio) into its constituent set of shots. In certain embodiments, shot-representation learning has two main components: (a) models 406, 414 for visual and audio modalities, and (b) momentum contrastive learning by comparator 418 to contrast the similarity of the embedded shots. Models 112 in FIG. 2 may be models 406, 414, and/or 442 in FIGS. 4A-4B, e.g., with trained query model 406 and trained temporal model 442 deployed as hosted plurality of models 236.

Self-Supervised Learning (e.g., Shot Encoder Network)

Certain embodiments herein use separate models (e.g., encoder networks) to learn representations for the audio and visual modalities of the input shots.

Visual modality:

Where scene boundaries exclusively depend on inter-shot relationships, encoding intra-shot frame-dynamics is not as important in certain embodiments. This leads to certain embodiments beginning by constructing a four-dimensional (4-D) tensor (w; h; c; k) from each shot with uniformly sampled k number of frames each with w width (e.g., in pixels), h height (e.g., in pixels), and c color channels (for example, in red, green, and blue (RGB) values, e.g., where red, green, and blue use a certain number of 8 bits each, e.g., 8 bit depth each which have integer values from 0 to 255). In certain embodiments, this 4-D tensor is reshaped into a three-dimensional (3-D) tensor, for example, by combining the c and k dimensions together (e.g., by concatenation along the color channel). In certain embodiments, this conversion offers advantages of (i) allowing a pre-trained network usage, e.g., for a network that support two-dimensional (2-D) images as input, by considering shots as 3-D tensors, it is able to directly apply a wide set of pretrained image-classification networks and/or (ii) resource efficiency, e.g., by not keeping the time dimension explicitly after the first layer of multiple layers of the encoder-network, this uses less memory and compute resources compared to using temporal networks (e.g. a 3-D convolutional neural network (CNN)). Certain embodiments herein utilize a convolutional neural network (CNN) model as the query model 406 and/or key model 414, e.g., a first CNN model as query model 406 and a separate, second CNN model as key model 414. In one embodiment, query model 406 and/or key model 414 for the visual modality each produce a multiple (e.g., 2048) dimensional feature vector to encode the visual signal for each shot.

Audio Modality:

To extract the audio embedding from each shot, certain embodiments herein use a (e.g., Wavegram-Logmel) CNN model as the query model 406 and/or key model 414, e.g., which incorporate multiple (e.g., 14) layers. Certain embodiments herein sample a given period (e.g., 10-seconds) of (e.g., mono) audio samples at a given rate (e.g., 32 kHz) from each shot. For shots that are less than the given period (e.g., 10 seconds), certain embodiments equally zero-pad the left and right to form a sample of the given period (e.g., 10 seconds). For shots longer than the given period (e.g., 10 seconds), certain embodiments extract a given period (e.g., 10 seconds) window from the center. In certain embodiments, these inputs are provided to a model to extract a multiple (e.g., 2048) dimensional feature vector for each shot.

Shot-Contrastive Learning:

Certain embodiments herein apply contrastive learning to obtain a shot representation that can effectively encode the local scene structure and is therefore conducive for scene boundary detection. To this end, certain embodiments herein use a pretext task that is able to exploit the underlying film-production process and encode the scene-structure, e.g., better than alternative video-representations. In certain embodiments, for a given query shot (e.g., shot five in FIG. 4A), self-supervised learning 402 first finds the positive key shot (e.g., shot three in FIG. 4A) as its most similar shot within a neighborhood around the query shot (e.g., 3 or 4 shots before the query shot and 3 or 4 shots after the query shot), and then: (a) maximizes the similarity between the query and the positive key, and (b) minimizes the similarity of the query with a set of randomly selected shots (e.g., negative keys). For this pretext task, no human annotated labels are used in certain embodiments. In certain embodiments, training is entirely based on the pseudo-labels created when the pairs of query and key are formed.

Similarity and Neighborhood:

As a more particular example, for a query at time t denoted as $q_t$, self-supervised learning 402 find its positive key $k_0$ as the most similar shot in a neighborhood (e.g., consisting of 2 * m shots centered at $q_t$). In certain embodiments, this similarity is calculated based on the embeddings of the query encoder $f(.|\theta_q)$:

$$k_0 = \arg\max_{x} f(q_t | \theta_q) \cdot f(x | \theta_q) \qquad (1)$$

where arg max is an operation that finds the argument that gives the maximum value from a target function, $\theta_q$ are the weights of the query encoder, and $x \in [q_{t-m}, \ldots, q_{t-2}, q_{t-1}, q_{t+1}, q_{t+2}, \ldots, q_{t+m},]$. In certain embodiments, along with K negative keys $S_K$, the K+1 shots ($k_0 \cup S_K$) are encoded by a key encoder to form a (K+1)-class classification task, e.g., where q is to be classified to class $k_0$. In certain embodiments, the pretext task can be considered as training an encoder for a dictionary look-up task, where given a query, the corresponding key should be matched. In certain embodiments, given an input query shot q, the goal is to find its positive key shot $k_0$ in a set of shots $\{k_0, k_1, k_2, \ldots, k_K\}$. In certain embodiments, by defining the similarity as a dot product (e.g., by comparator 418), a contrastive loss function (e.g., information noise-contrastive estimation (InfoNCE)) is utilized:

$$\mathcal{L}_q = -\log \frac{\exp(f(q|\theta_q) \cdot g(k_0|\theta_k)/\tau)}{\sum_{i=0}^{K} \exp(f(q|\theta_q) \cdot g(k_i|\theta_k)/\tau)} \qquad (2)$$

where $g(.|\theta_k)$: is the key encoder with the parameter $\theta_k$, e.g., where $\theta_k$ are the weights of the key encoder. In certain embodiments, $k_0$ is the positive key shot and $\{k_1, k_2, \ldots, k_K\}$ are the negative key shots and $\tau$ is the temperature term such that when it equals one, equation (2) becomes a standard log-loss function with softmax activation (e.g., that normalizes each component to be in the interval (0 to 1), and the components will add up to 1) for multi-class classification. In certain embodiments, using image-focused augmentation schemes does not incorporate any information about scene structure, and, similarly, choosing a shot adjacent to the query shot as the key can result in too high and unrelated appearance difference between the query and the key. Instead, certain embodiments herein select a similar nearby shot as the positive key that provides useful information related to the scene-structure and therefore facilitates learning a useful shot representation.

Momentum Contrast:

Although large dictionaries tend to lead to more accurate representations, they also incur additional computational cost. To address this challenge, embodiments herein save the embedded keys in a (e.g., fixed-sized) queue as negative keys. For example, when a new key (e.g., of a mini-batch of keys) come in, it is enqueued, e.g., and the oldest batch in the queue is dequeued. This allows the computed keys in the dictionary to be re-used, e.g., across mini-batches. To ensure consistency of keys when the key encoder evolves across mini-batch updates, a momentum update scheme is used for the key encoder in certain embodiments, e.g., with the following update equation:

$$\theta_k \leftarrow \alpha \cdot \theta_k + (1-\alpha) \cdot \theta_q \quad (3)$$

where $\alpha$ is the momentum coefficient (e.g., momentum update value 432 in FIG. 4A) (e.g., a value of 0.999). In certain embodiments, only query encoder weights ($\theta_q$) are updated during back propagation (e.g., back propagation update 428), and key encoder weights ($\theta_k$) can be considered as a moving average of query encoder weights ($\theta_q$) across back-propagation steps (e.g., such that query encoder weights are updated each iteration, but key encoder weights are changed at a slower rate that the query encoder weights). In certain embodiments, the weights $\theta_q$ of the query encoder are randomly initialized. In certain embodiments, the weights $\theta_k$ of the key encoder are initialized to the same values as the weights $\theta_q$ of the query encoder.

Supervised Learning

Recall that scenes are composed of a series of contiguous shots in certain embodiments. Therefore, embodiments herein formulate the problem of scene boundary detection as a binary classification problem of determining if a shot boundary is also a scene boundary or not. To this end, e.g., after dividing a full-length video into its constituent shots (e.g., using low-level visual cues), in certain embodiments, supervised learning 404, for each shot boundary, considers its 2 * N neighboring shots (e.g., N shots before and N shots after the shot-boundary) as data-points to perform scene boundary detection. In certain embodiments, for each data-point, query model (e.g., query encoder) (e.g., query model 406 in FIGS. 4A-4B) trained by contrastive learning is used to extract shot-level (e.g., visual or audio) features independently. In certain embodiments, the feature vectors of the 2 * N shots are concatenated into a single vector, which is then provided as an input to temporal model 442. In one embodiment, temporal model 442 is a classifier model, e.g., a multi-layer perceptron (MLP) classifier model. In one embodiment, a MLP model includes three fully connected (FC) layers where the final FC layer is followed by a softmax activation for normalizing the logits from FC layers into class probabilities of the positive and negative classes. In certain embodiments, the weights of the pre-trained encoder (e.g., query model 406) are kept fixed during this step, and only temporal model 442 (e.g., MLP) weights are learned. In one embodiment, during inference, for each shot boundary, the 2*N-shot sample is formed, the shot feature vectors are extracted and concatenated, and the concatenated features are sent to the trained temporal model 442, e.g., to predict if the shot boundary is a scene boundary or not (e.g., as a probability score).

In certain embodiments, query model 406 (e.g., one model trained for videos and one model trained separately on the corresponding audio for the videos) is used to generate video features and audio features for each shot, for example, with the video features and audio features concatenated together (e.g., respectively for each shot), e.g., and provided as input to temporal model 442.

In certain embodiments, trained query model 406 and trained temporal model 442 are used (e.g., deployed as hosted plurality of models 236 in FIG. 2) (e.g., according to the flow depicted in FIG. 4B) to generate an inference, e.g., scene boundary inference 444. Scene boundary inference may be used to find (e.g., estimate) timestamps in videos (e.g., movies and TV episodes) where video-ads can be inserted while being minimally disruptive. Such timestamps may be referred to as ad cue-points, e.g., and are required to follow multiple constraints. In certain embodiments, cue-points are to (i) only occur when the context of the storyline clearly and unambiguously changes, e.g., different from scene boundaries observed in other datasets where the before and after parts of a scene can be contextually closely related, (ii) not have dialogical activity in their immediate neighborhood, and/or (iii) be a certain duration apart and their total number within a certain limit which is a function of the video length. These constraints make ad cue-points detection a special case of scene-boundary detection.

Embodiments herein are directed to a self-supervised learning approach to learn a shot-representation for (e.g., long-form) videos using unlabeled video data, e.g., based on a key observation that nearby shots in long-form videos (e.g., movies and TV episodes) tend to have the same set of actors enacting a cohesive story-arch, and are therefore in expectation more similar to each other than a set of randomly selected shots. Embodiments herein use this observation to consider nearby similar shots as augmented versions of each other and use this augmentation scheme (e.g., in a contrastive learning setting) to encode the scene-structure more effectively than any other augmentation schemes, e.g., particularly schemes that are primarily geared towards images and short-videos.

Embodiments herein are directed to novel systems and methods for training one or more models used for scene change detection in titles, e.g., that can generate cue-points automatically based on a plurality of deep learning models.

Figure 5:
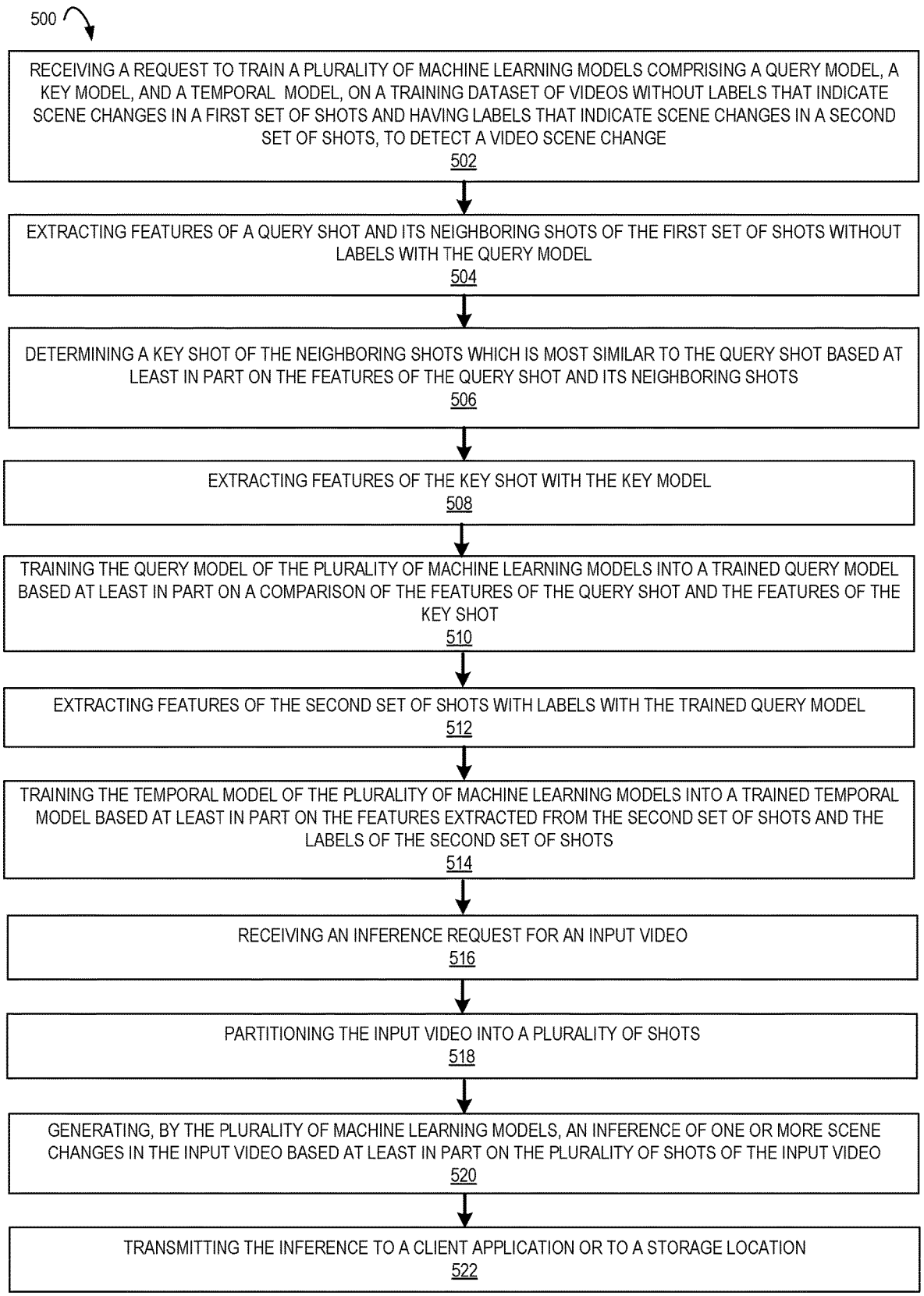
FIG. 5 is a flow diagram illustrating operations of a method for training and usage of a plurality of machine learning models to detect a scene change according to some embodiments.

FIG. 5 is a flow diagram illustrating operations 500 of a method for training and usage of a plurality of machine learning models to detect a scene change according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by provider network 200 of the other figures.

The operations 500 include, at block 502, receiving a request to train a plurality of machine learning models comprising a query model, a key model, and a temporal model, on a training dataset of videos without labels that indicate scene changes in a first set of shots and having labels that indicate scene changes in a second set of shots, to detect a video scene change. The operations 500 further include, at block 504, extracting features of a query shot and its neighboring shots of the first set of shots without labels with the query model. The operations 500 further include, at block 506, determining a key shot of the neighboring shots which is most similar to the query shot based at least in part on the features of the query shot and its neighboring shots. The operations 500 further include, at block 508, extracting features of the key shot with the key model. The operations 500 further include, at block 510, training the query model of the plurality of machine learning models into a trained query model based at least in part on a comparison of the features of the query shot and the features of the key shot. The operations 500 further include, at block 512, extracting features of the second set of shots with labels with the trained query model. The operations 500 further include, at block 514, training the temporal model of the plurality of machine learning models into a trained temporal model based at least in part on the features extracted from the second set of shots and the labels of the second set of shots. The operations 500 further include, at block 516, receiving an inference request for an input video. The operations 500 further include, at block 518, partitioning the input video into a plurality of shots. The operations 500 further include, at block 520, generating, by the plurality of machine learning models, an inference of one or more scene changes in the input video based at least in part on the plurality of shots of the input video. The operations 500 further include, at block 522, transmitting the inference to a client application or to a storage location.

Figure 6:
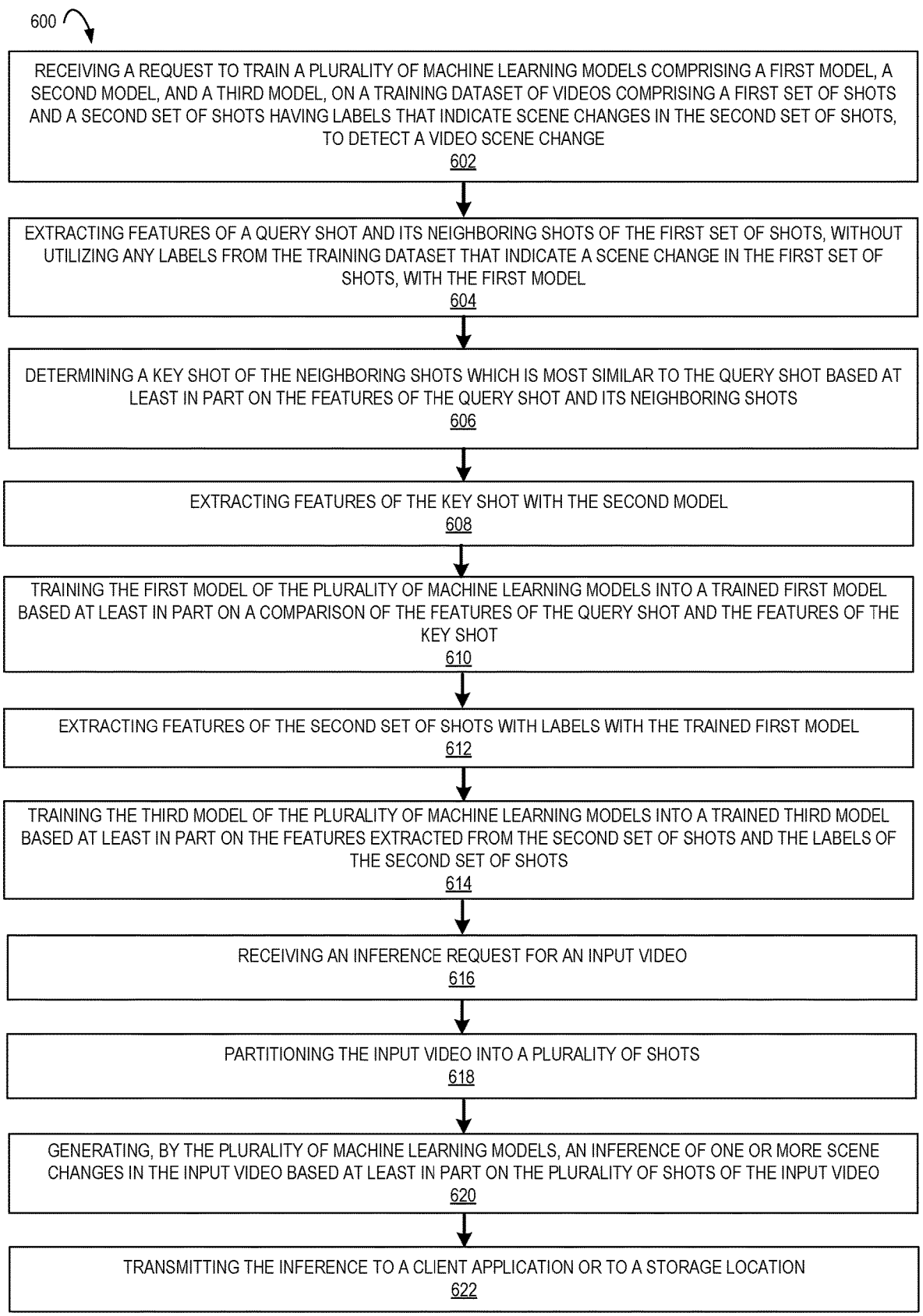
FIG. 6 is a flow diagram illustrating operations of a method for training and usage of a plurality of machine learning models to detect a scene change according to other embodiments.

FIG. 6 is a flow diagram illustrating operations 600 of a method for training and usage of a plurality of machine learning models to detect a scene change according to other embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by provider network 200 of the other figures.

The operations 600 include, at block 602, receiving a request to train a plurality of machine learning models comprising a first model, a second model, and a third model, on a training dataset of videos comprising a first set of shots and a second set of shots having labels that indicate scene changes in the second set of shots, to detect a video scene change. The operations 600 further include, at block 604, extracting features of a query shot and its neighboring shots of the first set of shots, without utilizing any labels from the training dataset that indicate a scene change in the first set of shots, with the first model. The operations 600 further include, at block 606, determining a key shot of the neighboring shots which is most similar to the query shot based at least in part on the features of the query shot and its neighboring shots. The operations 600 further include, at block 608, extracting features of the key shot with the second model. The operations 600 further include, at block 610, training the first model of the plurality of machine learning models into a trained first model based at least in part on a comparison of the features of the query shot and the features of the key shot. The operations 600 further include, at block 612, extracting features of the second set of shots with labels with the trained first model. The operations 600 further include, at block 614, training the third model of the plurality of machine learning models into a trained third model based at least in part on the features extracted from the second set of shots and the labels of the second set of shots. The operations 600 further include, at block 616, receiving an inference request for an input video. The operations 600 further include, at block 618, partitioning the input video into a plurality of shots. The operations 600 further include, at block 620, generating, by the plurality of machine learning models, an inference of one or more scene changes in the input video based at least in part on the plurality of shots of the input video. The operations 600 further include, at block 622, transmitting the inference to a client application or to a storage location.

Exemplary environments, systems, etc. that the above may be used in are detailed below.

At least some embodiments of the disclosed technologies can be described in view of the following examples:

Example 1. A computer-implemented method comprising:
receiving a request to train a plurality of machine learning models comprising a query model, a key model, and a temporal model, on a training dataset of videos without labels that indicate scene changes in a first set of shots and having labels that indicate scene changes in a second set of shots, to detect a video scene change;
extracting features of a query shot and its neighboring shots of the first set of shots without labels with the query model;
determining a key shot of the neighboring shots which is most similar to the query shot based at least in part on the features of the query shot and its neighboring shots;
extracting features of the key shot with the key model;
training the query model of the plurality of machine learning models into a trained query model based at least in part on a comparison of the features of the query shot and the features of the key shot;
extracting features of the second set of shots with labels with the trained query model;
training the temporal model of the plurality of machine learning models into a trained temporal model based at least in part on the features extracted from the second set of shots and the labels of the second set of shots;
receiving an inference request for an input video;
partitioning the input video into a plurality of shots;
generating, by the plurality of machine learning models, an inference of one or more scene changes in the input video based at least in part on the plurality of shots of the input video; and
transmitting the inference to a client application or to a storage location.

Example 2. The computer-implemented method of example 1, further comprising updating weights of the key model based at least in part on a momentum update value and weights of the trained query model.

Example 3. The computer-implemented method of example 1, wherein the training the query model of the plurality of machine learning models into the trained query model is based at least in part on a comparison of the features of the query shot, the features of the key shot, and features previously extracted for other key shots.

Example 4. A computer-implemented method comprising:
receiving a request to train a plurality of machine learning models comprising a first model, a second model, and a third model, on a training dataset of videos comprising a first set of shots and a second set of shots having labels that indicate scene changes in the second set of shots, to detect a video scene change;

extracting features of a query shot and its neighboring shots of the first set of shots, without utilizing any labels from the training dataset that indicate a scene change in the first set of shots, with the first model;

determining a key shot of the neighboring shots which is most similar to the query shot based at least in part on the features of the query shot and its neighboring shots;

extracting features of the key shot with the second model;

training the first model of the plurality of machine learning models into a trained first model based at least in part on a comparison of the features of the query shot and the features of the key shot;

extracting features of the second set of shots with labels with the trained first model;

training the third model of the plurality of machine learning models into a trained third model based at least in part on the features extracted from the second set of shots and the labels of the second set of shots;

receiving an inference request for an input video;

partitioning the input video into a plurality of shots;

generating, by the plurality of machine learning models, an inference of one or more scene changes in the input video based at least in part on the plurality of shots of the input video; and transmitting the inference to a client application or to a storage location.

Example 5. The computer-implemented method of example 4, further comprising updating weights of the second model based at least in part on a momentum update value and weights of the trained first model.

Example 6. The computer-implemented method of example 4, wherein the training the first model of the plurality of machine learning models into the trained first model is based at least in part on a comparison of the features of the query shot, the features of the key shot, and features previously extracted for other key shots.

Example 7. The computer-implemented method of example 6, further comprising: accessing the features previously extracted for other key shots from a key feature queue; and storing the features of the key shot into the key feature queue after the accessing.

Example 8. The computer-implemented method of example 6, wherein the training the first model of the plurality of machine learning models into the trained first model comprises maximizing a similarity between the query shot and the key shot and minimizing a similarity of the query shot and the other key shots.

Example 9. The computer-implemented method of example 4, wherein the extracting of the features of the query shot and its neighboring shots of the first set of shots is without utilizing any human annotated labels from the training dataset that indicate a scene change in the first set of shots.

Example 10. The computer-implemented method of example 4, further comprising generating, for the query shot and its neighboring shots, a four-dimensional tensor that comprises a pixel width, a pixel height, color channels, and a number of frames, wherein the extracting of the features of the query shot and its neighboring shots of the first set of shots is based at least in part on the four-dimensional tensors.

Example 11. The computer-implemented method of example 4, further comprising: generating, for the query shot and its neighboring shots, a four-dimensional tensor that comprises a pixel width, a pixel height, color channels, and a number of frames; and combining the color channels and the number of frames together to form a three-dimensional tensor for each of the query shot and its neighboring shots, wherein the extracting of the features of the query shot and its neighboring shots of the first set of shots is based at least in part on the three-dimensional tensors.

Example 12. The computer-implemented method of example 4, further comprising:

extracting audio features of the query shot and its neighboring shots of the first set of shots without utilizing any labels from the training dataset that indicate a scene change in the first set of shots, wherein the extracting the features of the query shot and its neighboring shots of the first set of shots, without utilizing any labels from the training dataset that indicate a scene change in the first set of shots, with the first model extracts video features; and combining respective audio features and video features for each of the query shot and its neighboring shots, wherein the determining the key shot of the neighboring shots which is most similar to the query shot is based at least in part on the combined respective audio features and video features of each of the query shot and its neighboring shots.

Example 13. The computer-implemented method of example 4, wherein the third model is a language machine learning model.

Example 14. The computer-implemented method of example 4, further comprising:

inserting secondary content into the input video at a shot boundary indicated by the inference as a scene change to generate an output video;

receiving a request for the output video from a client device; and sending the output video to the client device.

Example 15. A system comprising:

a content data store to store an input video; and a machine learning service implemented by a one or more electronic devices, the machine learning service including instructions that upon execution cause the one or more electronic devices to perform operations comprising:

receiving a request to train a plurality of machine learning models comprising a first model, a second model, and a third model, on a training dataset of videos comprising a first set of shots and a second set of shots having labels that indicate scene changes in the second set of shots, to detect a video scene change, extracting features of a query shot and its neighboring shots of the first set of shots, without utilizing any labels from the training dataset that indicate a scene change in the first set of shots, with the first model, determining a key shot of the neighboring shots which is most similar to the query shot based at least in part on the features of the query shot and its neighboring shots, extracting features of the key shot with the second model, training the first model of the plurality of machine learning models into a trained first model based at least in part on a comparison of the features of the query shot and the features of the key shot, extracting features of the second set of shots with labels with the trained first model, training the third model of the plurality of machine learning models into a trained third model based at least in part on the features extracted from the second set of shots and the labels of the second set of shots,
receiving an inference request for the input video,
partitioning the input video into a plurality of shots,
generating, by the plurality of machine learning models, an inference of one or more scene changes in the input video based at least in part on the plurality of shots of the input video, and
transmitting the inference to a client application or to a storage location.

Example 16. The system of example 15, wherein the machine learning service further includes instructions that upon execution cause the one or more electronic devices to perform operations comprising updating weights of the second model based at least in part on a momentum update value and weights of the trained first model.

Example 17. The system of example 15, wherein the machine learning service further includes instructions that upon execution cause the one or more electronic devices to perform operations wherein the training the first model of the plurality of machine learning models into the trained first model is based at least in part on a comparison of the features of the query shot, the features of the key shot, and features previously extracted for other key shots.

Example 18. The system of example 17, wherein the machine learning service further includes instructions that upon execution cause the one or more electronic devices to perform operations wherein the training the first model of the plurality of machine learning models into the trained first model comprises maximizing a similarity between the query shot and the key shot and minimizing a similarity of the query shot and the other key shots.

Example 19. The system of example 15, wherein the machine learning service further includes instructions that upon execution cause the one or more electronic devices to perform operations comprising:
generating, for the query shot and its neighboring shots, a four-dimensional tensor that comprises a pixel width, a pixel height, color channels, and a number of frames; and
combining the color channels and the number of frames together to form a three-dimensional tensor for each of the query shot and its neighboring shots, wherein the extracting of the features of the query shot and its neighboring shots of the first set of shots is based at least in part on the three-dimensional tensors.

Example 20. The system of example 15, wherein the machine learning service further includes instructions that upon execution cause the one or more electronic devices to perform operations comprising:
extracting audio features of the query shot and its neighboring shots of the first set of shots without utilizing any labels from the training dataset that indicate a scene change in the first set of shots, wherein the extracting the features of the query shot and its neighboring shots of the first set of shots, without utilizing any labels from the training dataset that indicate a scene change in the first set of shots, with the first model extracts video features; and
combining respective audio features and video features for each of the query shot and its neighboring shots, wherein the determining the key shot of the neighboring shots which is most similar to the query shot is based at least in part on the combined respective audio features and video features of each of the query shot and its neighboring shots.

Figure 7:
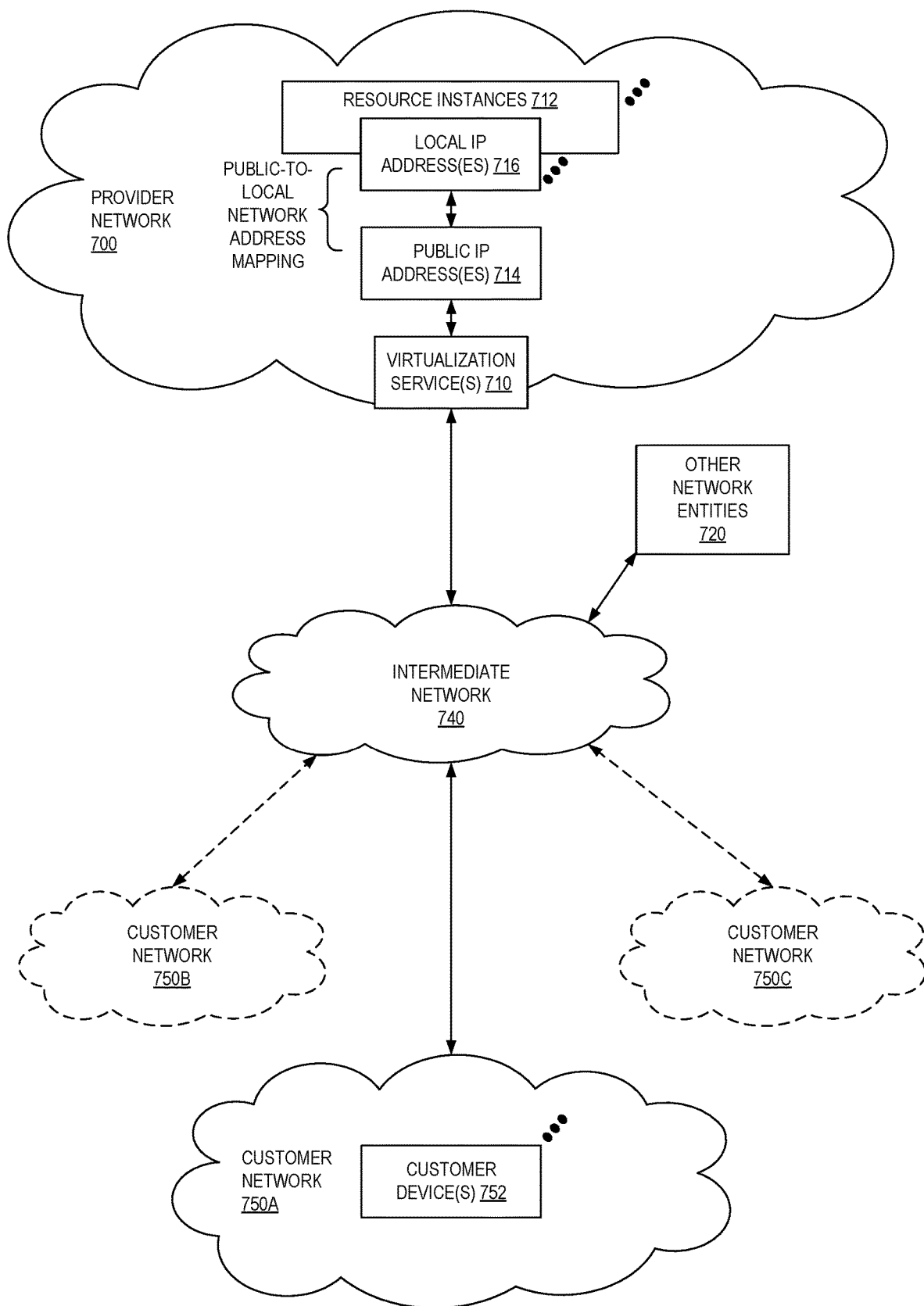
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
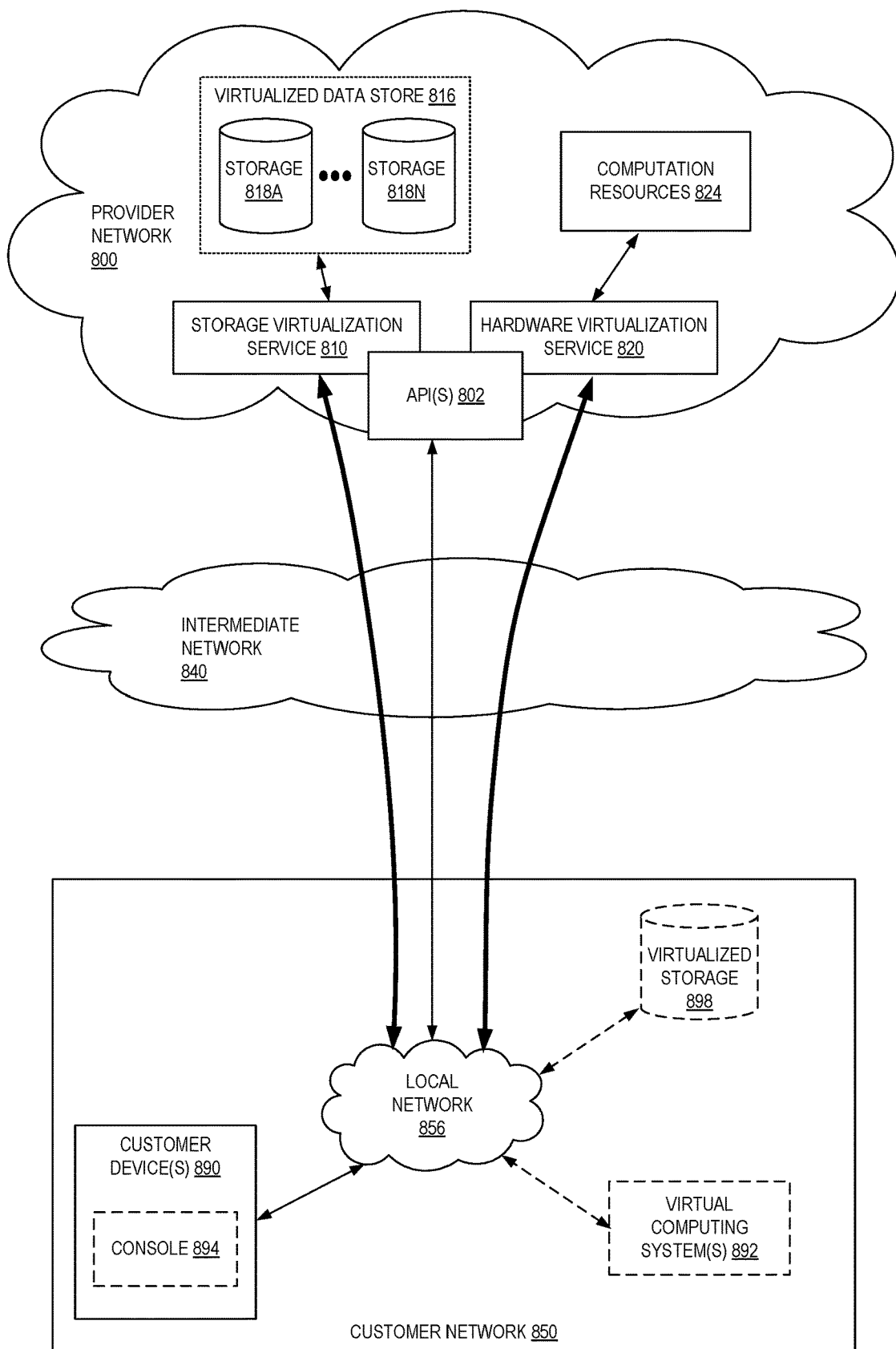
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative system

Figure 9:
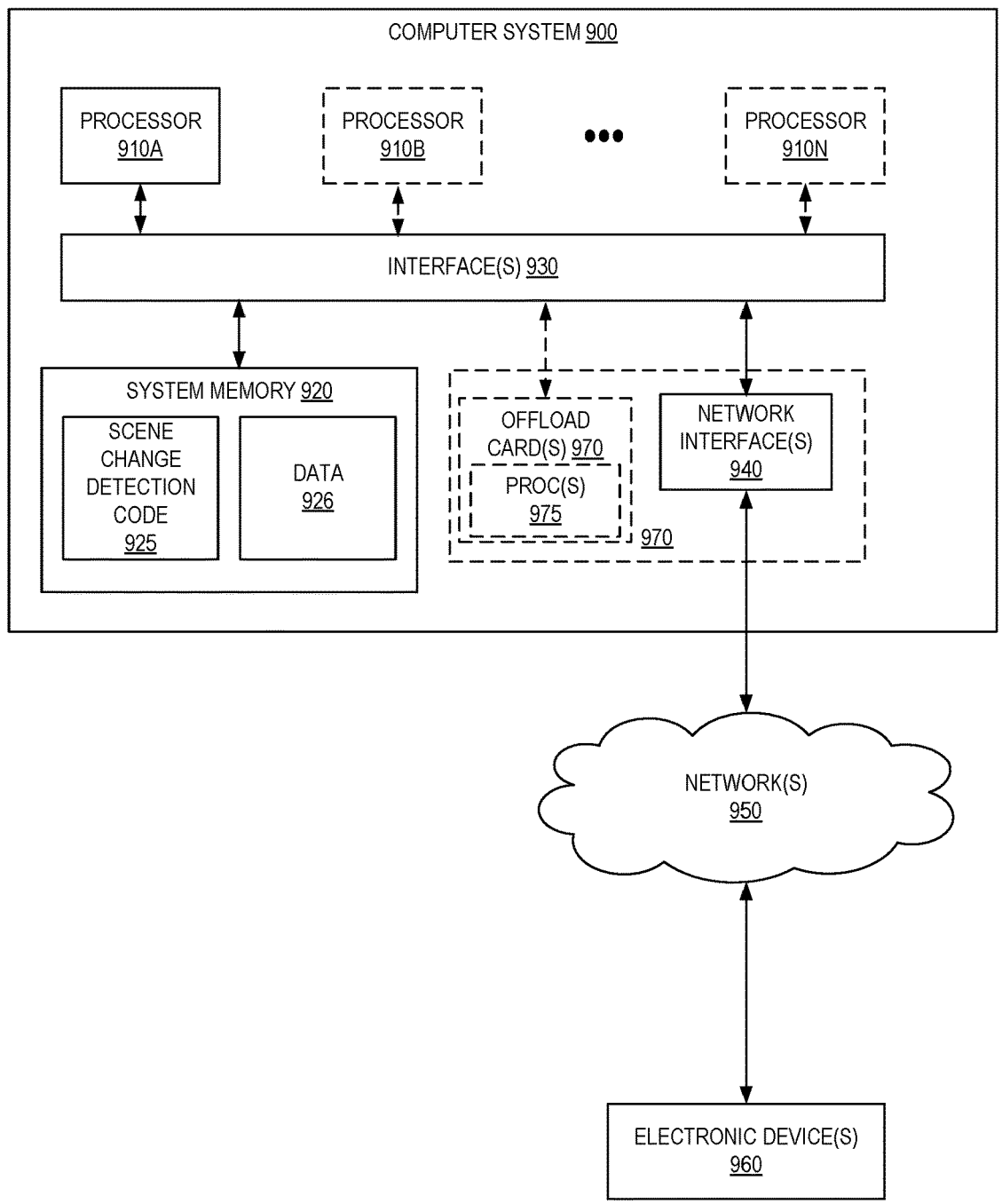
FIG. 9 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as scene change detection code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
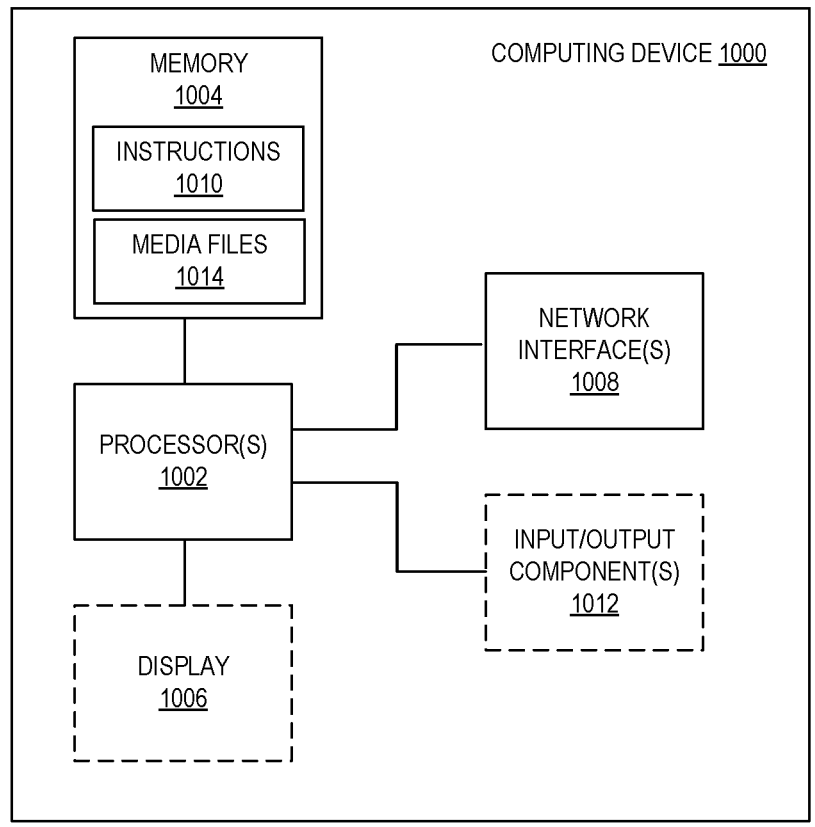
FIG. 10 illustrates a logical arrangement of a set of general components of an exemplary computing device that can be utilized in accordance with various embodiments.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a scene change detector as disclosed herein) and/or media files 1014 (e.g., generated by packaging service 124 in FIG. 1), and a set of one or more wired or wireless network interfaces 1008 allowing the electronic device to transmit data to and receive data from other computing devices, typically across one or more networks (e.g., Local Area Networks (LANs), the Internet). For example, where computing device 1000 is an instance of client device 128 in FIG. 1, e.g., and is coupled via network interface(s) 1008 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
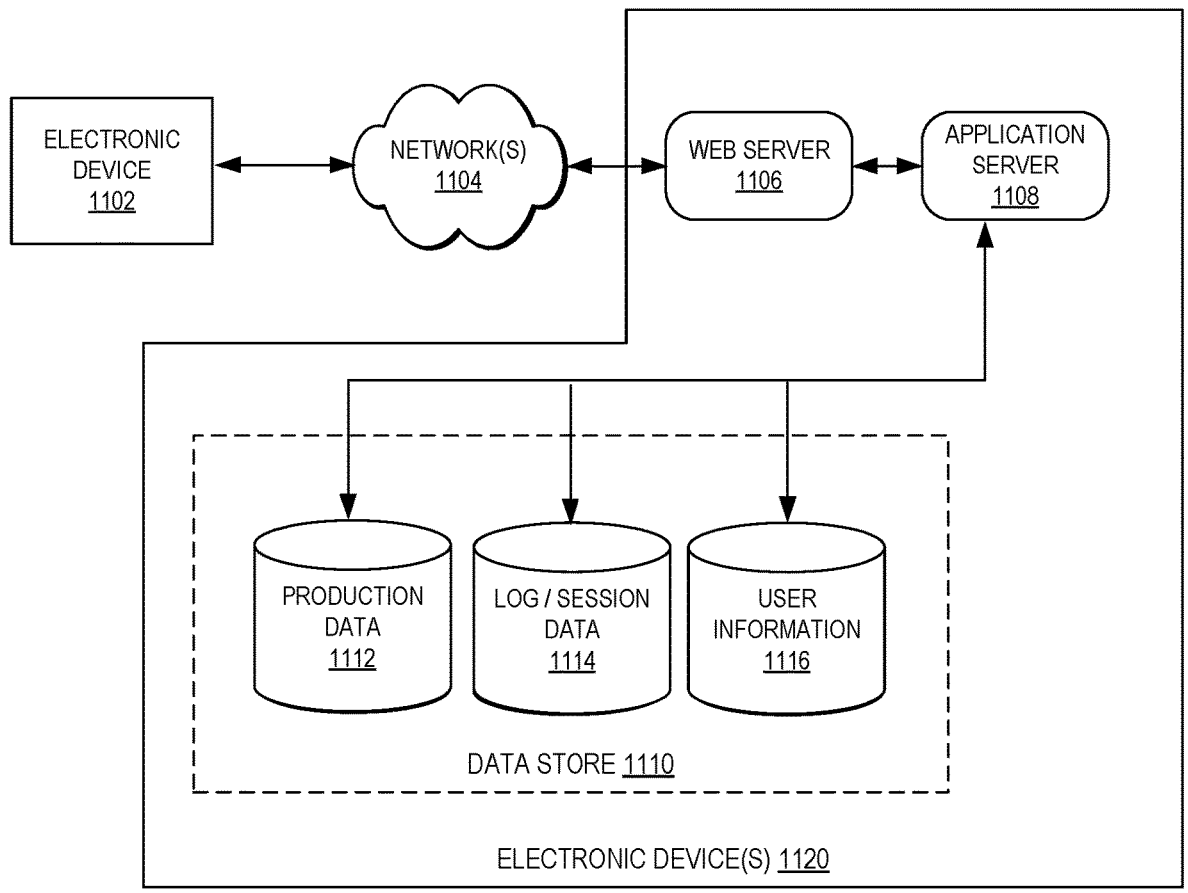
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages, or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to train a plurality of machine learning models comprising a query model, a key model, and a temporal model, on a training dataset of videos without labels that indicate scene changes in a first set of shots and having labels that indicate scene changes in a second set of shots, to detect a video scene change;
extracting features of a query shot, and neighboring shots of the query shot, of the first set of shots without labels with the query model;
determining a key shot of the neighboring shots which is most similar to the query shot based at least in part on the features of the query shot and the neighboring shots;
extracting features of the key shot with the key model;
training the query model of the plurality of machine learning models into a trained query model based at least in part on a comparison of the features of the query shot and the features of the key shot;
extracting features of the second set of shots with labels with the trained query model;
training the temporal model of the plurality of machine learning models into a trained temporal model based at least in part on the features extracted from the second set of shots and the labels of the second set of shots;
receiving an inference request for an input video;
partitioning the input video into a plurality of shots;
generating, by the plurality of machine learning models, an inference of one or more scene changes in the input video based at least in part on the plurality of shots of the input video; and
transmitting the inference to a client application or to a storage location.

2. The computer-implemented method of claim 1, further comprising updating weights of the key model based at least in part on a momentum update value and weights of the trained query model.

3. The computer-implemented method of claim 1, wherein the training the query model of the plurality of machine learning models into the trained query model is based at least in part on a comparison of the features of the query shot, the features of the key shot, and features previously extracted for other key shots.

4. A computer-implemented method comprising:
receiving a request to train a plurality of machine learning models comprising a first model, a second model, and a third model, on a training dataset of videos comprising a first set of shots and a second set of shots having labels that indicate scene changes in the second set of shots, to detect a video scene change;
extracting features of a query shot, and neighboring shots of the query shot, of the first set of shots, without utilizing any labels from the training dataset that indicate a scene change in the first set of shots, with the first model;
determining a key shot of the neighboring shots which is most similar to the query shot based at least in part on the features of the query shot and the neighboring shots;
extracting features of the key shot with the second model;
training the first model of the plurality of machine learning models into a trained first model based at least in part on a comparison of the features of the query shot and the features of the key shot;
extracting features of the second set of shots with labels with the trained first model;
training the third model of the plurality of machine learning models into a trained third model based at least in part on the features extracted from the second set of shots and the labels of the second set of shots;
receiving an inference request for an input video;
partitioning the input video into a plurality of shots;
generating, by the plurality of machine learning models, an inference of one or more scene changes in the input video based at least in part on the plurality of shots of the input video; and
transmitting the inference to a client application or to a storage location.

5. The computer-implemented method of claim 4, further comprising updating weights of the second model based at least in part on a momentum update value and weights of the trained first model.

6. The computer-implemented method of claim 4, wherein the training the first model of the plurality of machine learning models into the trained first model is based at least in part on a comparison of the features of the query shot, the features of the key shot, and features previously extracted for other key shots.

7. The computer-implemented method of claim 6, further comprising:
accessing the features previously extracted for other key shots from a key feature queue; and
storing the features of the key shot into the key feature queue after the accessing.

8. The computer-implemented method of claim 6, wherein the training the first model of the plurality of machine learning models into the trained first model comprises maximizing a similarity between the query shot and the key shot and minimizing a similarity of the query shot and the other key shots.

9. The computer-implemented method of claim 4, wherein the extracting of the features of the query shot and the neighboring shots of the first set of shots is without utilizing any human annotated labels from the training dataset that indicate a scene change in the first set of shots.

10. The computer-implemented method of claim 4, further comprising generating, for the query shot and the neighboring shots, a four-dimensional tensor that comprises a pixel width, a pixel height, color channels, and a number of frames, wherein the extracting of the features of the query shot and the neighboring shots of the first set of shots is based at least in part on the four-dimensional tensors.

11. The computer-implemented method of claim 4, further comprising:
generating, for the query shot and the neighboring shots, a four-dimensional tensor that comprises a pixel width, a pixel height, color channels, and a number of frames; and
combining the color channels and the number of frames together to form a three-dimensional tensor for each of the query shot and the neighboring shots, wherein the extracting of the features of the query shot and the neighboring shots of the first set of shots is based at least in part on the three-dimensional tensors.

12. The computer-implemented method of claim 4, further comprising:
extracting audio features of the query shot and the neighboring shots of the first set of shots without utilizing any labels from the training dataset that indicate a scene change in the first set of shots, wherein the extracting the features of the query shot and the neighboring shots of the first set of shots, without utilizing any labels from the training dataset that indicate a scene change in the first set of shots, with the first model extracts video features; and
combining respective audio features and video features for each of the query shot and the neighboring shots, wherein the determining the key shot of the neighboring shots which is most similar to the query shot is based at least in part on the combined respective audio features and video features of each of the query shot and the neighboring shots.

13. The computer-implemented method of claim 4, wherein the third model is a language machine learning model.

14. The computer-implemented method of claim 4, further comprising:
inserting secondary content into the input video at a shot boundary indicated by the inference as a scene change to generate an output video;
receiving a request for the output video from a client device; and
sending the output video to the client device.

15. A system comprising:
a content data store to store an input video; and
a machine learning service implemented by a one or more electronic devices, the machine learning service including instructions that upon execution cause the one or more electronic devices to perform operations comprising:
receiving a request to train a plurality of machine learning models comprising a first model, a second model, and a third model, on a training dataset of videos comprising a first set of shots and a second set of shots having labels that indicate scene changes in the second set of shots, to detect a video scene change;
extracting features of a query shot, and neighboring shots of the query shot, of the first set of shots, without utilizing any labels from the training dataset that indicate a scene change in the first set of shots, with the first model;
determining a key shot of the neighboring shots which is most similar to the query shot based at least in part on the features of the query shot and the neighboring shots;
extracting features of the key shot with the second model;
training the first model of the plurality of machine learning models into a trained first model based at least in part on a comparison of the features of the query shot and the features of the key shot;
extracting features of the second set of shots with labels with the trained first model;
training the third model of the plurality of machine learning models into a trained third model based at least in part on the features extracted from the second set of shots and the labels of the second set of shots;
receiving an inference request for the input video;
partitioning the input video into a plurality of shots;
generating, by the plurality of machine learning models, an inference of one or more scene changes in the input video based at least in part on the plurality of shots of the input video; and
transmitting the inference to a client application or to a storage location.

16. The system of claim 15, wherein the machine learning service further includes instructions that upon execution cause the one or more electronic devices to perform operations comprising updating weights of the second model based at least in part on a momentum update value and weights of the trained first model.

17. The system of claim 15, wherein the machine learning service further includes instructions that upon execution cause the one or more electronic devices to perform operations wherein the training the first model of the plurality of machine learning models into the trained first model is based at least in part on a comparison of the features of the query shot, the features of the key shot, and features previously extracted for other key shots.

18. The system of claim 17, wherein the machine learning service further includes instructions that upon execution cause the one or more electronic devices to perform operations wherein the training the first model of the plurality of machine learning models into the trained first model comprises maximizing a similarity between the query shot and the key shot and minimizing a similarity of the query shot and the other key shots.

19. The system of claim 15, wherein the machine learning service further includes instructions that upon execution cause the one or more electronic devices to perform operations comprising:
generating, for the query shot and the neighboring shots, a four-dimensional tensor that comprises a pixel width, a pixel height, color channels, and a number of frames; and
combining the color channels and the number of frames together to form a three-dimensional tensor for each of the query shot and the neighboring shots, wherein the extracting of the features of the query shot and the neighboring shots of the first set of shots is based at least in part on the three-dimensional tensors.

20. The system of claim 15, wherein the machine learning service further includes instructions that upon execution cause the one or more electronic devices to perform operations comprising:
extracting audio features of the query shot and the neighboring shots of the first set of shots without utilizing any labels from the training dataset that indicate a scene change in the first set of shots, wherein the extracting the features of the query shot and the neighboring shots of the first set of shots, without utilizing any labels from the training dataset that indicate a scene change in the first set of shots, with the first model extracts video features; and combining respective audio features and video features for each of the query shot and the neighboring shots, wherein the determining the key shot of the neighboring shots which is most similar to the query shot is based at least in part on the combined respective audio features and video features of each of the query shot and the neighboring shots.

\* \* \* \* \*